United States Patent Office 3,275,663
Patented Sept. 27, 1966

1

3,275,663
2-HYDROXYMETHYLENE TESTOSTERONE
DERIVATIVES
Howard J. Ringold and George Rosenkranz, Mexico City,
Mexico, assignors, by mesne assignments, to Syntex
Corporation, a corporation of Panama
No Drawing. Filed Jan. 21, 1960, Ser. No. 3,748
Claims priority, application Mexico, Aug. 30, 1957,
48,697
16 Claims. (Cl. 260—397.4)

This is a continuation-in-part of our copending application Serial No. 702,763, filed December 16, 1957, and of our copending application Serial No. 757,923, filed August 29, 1958, which in turn is a continuation-in-part of our copending application Serial No. 636,860, filed January 29, 1957, now all abandoned.

The present invention relates to cyclopentanophenanthrene compounds and to a novel process for the production thereof.

More particularly the present invention relates to the production of novel anabolic agents having a steroid nucleus and at C–2 a hydroxymethylene moiety as well as 2-esters and 2-ethers thereof.

The novel anabolic agents of the present invention may be characterized by the following formulae:

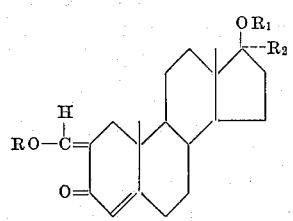

and

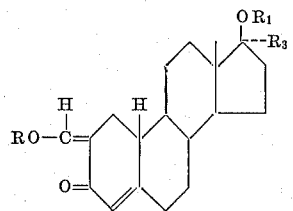

In the above formulae, R represents hydrogen, lower alkyl such as methyl, ethyl, propyl or isopropyl, or aralkyl, such as benzyl or R may represent an ester group preferably a residue of a hydrocarbon carboxylic acid of less than 12 carbon atoms. The ester groups may be saturated or unsaturated, aliphatic, aromatic, cyclic and may be substituted by, for example, halogen. Typical ester groups are benzoate, phenoxyacetate, acetate, propionate, caproate, enanthate, cyclopentylpropionate, etc. $R_1$ may be hydrogen or an ester group of the same type as R. $R_2$ represents lower alkyl while $R_3$ represents hydrogen or a lower alkyl group of less than 7 carbon atoms such as methyl, ethyl, propyl or butyl.

In accordance with the present invention it has been found the novel compounds are androgenic type hormones having a pronounced anabolic effect and/or a superior anabolic-androgenic ratio. It has further been discovered that these compounds may be prepared by a novel process involving treatment of the corresponding steroid compounds unsubstituted at C–2 with ethyl formate, followed, if the ethers or esters are desired, by conventional etherification or esterification steps.

2

The process of the present invention may therefore be illustrated by the following equations:

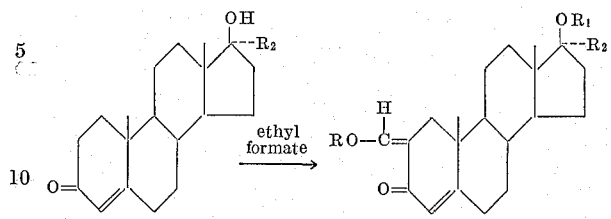

In the above formula R, $R_1$ and $R_2$ represent the same groups as heretofore set forth. Similarly the known 19-nor-testosterone or 19-nor-17α-lower alkyl testosterones may be treated with ethyl formate. As may be understood the groups indicated by R and $R_1$ result from conventional esterification or etherification of the novel 2-hydroxymethylene-derivatives of 17α-lower alkyl-testosterone and 19-nor testosterone and of the 17α-lower alkyl derivatives thereof.

In practicing the process outlined above, 19-nor-testosterone or the 17α-lower alkyl derivatives of testosterone or of 19-nor-testosterone are suspended in an inert organic solvent such as benzene, toluene, tertiary butyl alcohol or dioxane and mixed with ethyl formate and alkali metal hydride or alkali metal alkoxide and allowed to stand at room temperature for a period of time of the order of 5 to 24 hours. The precipitate, a mixture of the alkali metal salt of the desired 2-hydroxymethylene derivative and excess alkali metal compound was then treated with mineral acid such as hydrochloric acid in water to precipitate the 2-hydroxymethylene derivative which was then purified.

By conventional esterification procedures as with acid anhydride or chloride in pyridine solution at room temperature there is formed the diesters of the 2-hydroxymethylene compounds which have a secondary hydroxyl group at C–17 and the 2-monoesters are formed when a tertiary hydroxyl group is present at C–17. When the diester of the latter compound is desired, the compound is refluxed with an excess of the acid anhydride in pyridine solution. There may also be prepared the 2-mono esters of the 2-hydroxymethylene derivatives having a secondary or tertiary hydroxyl group at C–17 by adding the appropriate acid chloride to the 2-hydroxymethylene derivative in dilute aqueous sodium hydroxide. There may also be prepared mixed esters wherein R and $R_1$ are different acyl groups by further reaction of the 2-mono esters with a different acid anhydride under reflux conditions.

For preparation of the 2-ether derivatives i.e. where R represents lower alkyl or aralkyl, the free compound was refluxed with the corresponding alkyl halide in an inert organic solvent such as acetone and a base such as potassium carbonate.

The following specific examples serve to illustrate but are not intended to limit the present invention.

*Example I*

A mixture of 20 g. of 17α-methyl-testosterone, 250 cc. benzene, 20 cc. of ethyl formate and 3 g. of sodium hydride was kept for one day at room temperature under an atmosphere of nitrogen. The precipitate was filtered, washed with benzene, then hexane and dried in vacuo. The dried powder was added in portions with stirring to a cold solution of 50 ml. of concentrated hydrochloric acid in 500 ml. of water. The mixture was stirred for 30 minutes, the precipitate filtered, washed with water, dried and crystallized from ethyl acetate to give the 2-hydroxymethylene derivative of 17α-methyl testosterone (Δ⁴-androstene-17β-ol-3-one).

Example II

By the procedure of Example I from other 17α-lower alkyl derivatives (ethyl, propyl) of testosterone, there was prepared the corresponding 17α-ethyl and propyl-2-hydroxymethylene derivatives.

Example III 1 g. of 2-hydroxymethylene-17α-methyl-testosterone was dissolved in 20 cc. of 3% aqueous sodium hydroxide solution, cooled to 10° C. and then mixed with benzoyl chloride dropwise until the solution had a weakly acidic reaction, while the mixture was vigorously stirred. After diluting with water the product was extracted with ether, washed with water, dried over anhydrous sodium sulfate, filtered and evaporated to dryness. The residue crystallized from acetone-hexane to give 2-benzoxymethylene-17α-methyl-testosterone.

Example IV

A solution of 1 g. 2-hydroxymethylene-17α-methyl-testosterone in 10 cc. of pyridine was treated with 1 cc. of propionic anhydride and the mixture was kept at room temperature overnight. After pouring into water, the resulting suspension was heated for half an hour on the steam bath and cooled; the precipitate was collected, washed with water, and dried. Crystallization from acetone-hexane afforded the 2-monopropionate of 2-hydroxymethylene-17α-methyl-testosterone, namely 2-propionoxy - methylene - 17α - methyl - $\Delta^4$ - androstene - 17β-ol-3-one.

Example V

When in the previous example the propionic anhydride was substituted by 1.1 molar equivalents of propionyl chloride, the final product obtained was the same. By the same methods as this example and that of Example IV, using other corresponding anhydride or chlorides, there were prepared the corresponding 2-cyclopentyl-propionates 2-acetates and 2-benzoates of all of the compounds prepared according to Examples I and II.

Example VI

A mixture of 2-hydroxymethylene-17α-ethyl-testosterone, 10 cc. of pyridine and 2 cc. of acetic anhydride was refluxed for 12 hours and then poured into ice water. The product was extracted with ethyl acetate, the extract was washed with dilute hydrochloric acid, 5% sodium carbonate solution and with water to neutral, dried over anhydrous sodium sulfate and evaporated to dryness. Recrystallization of the residue from acetone-hexane yielded the diacetate of 2-hydroxymethylene-17α-ethyl-testosterone, namely 2-acetoxymethylene-17α-ethyl-17β-acetate-$\Delta^4$-androsten-3-one. By the same method, using corresponding acid anhydrides or chlorides there were prepared the 2,17-diacetate, 2,17-dipropionate, 2,17-dibenzoate and 2,17-dicyclopentylpropionate of all of the compounds of Examples I and II.

Example VII 1 g. of 2-benzoxymethylene-17α-methyl-testosterone obtained in accordance with Example III was dissolved in 10 cc. of pyridine and mixed with 2 cc. of propionic anhydride. The mixture was refluxed and worked up as in Example VI to give 2-benzoxymethylene-17β-propionoxy-17α-methyl-testosterone. By the same method using the corresponding anhydride there were prepared the 2-benzoxymethylene-17β-acetoxy, the 2-benzoxymethylene-17β-cyclopentylpropionoxy and other mixed esters of the compounds of Example I and II.

Example VIII

A mixture of 1 g. of 2-hydroxymethylene-17α-methyl-testosterone, 50 cc. of absolute methyl iodide, 50 cc. of anhydrous acetone and 1 g. of anhydrous powdered potassium carbonate was refluxed for 48 hours and then poured into water. The product was extracted with ether, the extract was washed with water, dried over anhydrous sodium sulfate and evaporated to dryness. The residue was purified by chromatography on washed alumina thus giving 2-methoxy methylene-17α-methyl-testosterone. The same method applied to the other 2-hydroxymethylene derivatives of Examples I and II gave corresponding 2-methoxy methylene compounds.

Example IX 1 g. of 2-hydroxymethylene-17α-propyl-testosterone was dissolved in 50 cc. of absolute n-propyl iodide and 50 cc. of anhydrous acetone, mixed with 1 g. of powdered anhydrous potassium carbonate and the mixture was refluxed for 48 hours. After pouring into water, the product was extracted with ethyl acetate, the extract was washed with water, dried over anhydrous sodium sulfate, filtered and evaporated to dryness. The residue crystallized from acetone-hexane to yield 2-propoxymethylene-17α-propyl-testosterone. The same method applied to other 2-hydroxymethylene derivatives of Examples I and II gave corresponding 2-propoxy compounds.

Example X

A solution of 10 g. of 19-nor-testosterone in 500 cc. of thiophene free benzene was mixed under nitrogen with 10 cc. of ethyl formate, followed by the addition in small portions of 3 g. of sodium hydride. The mixture was stirred for 5 hours and the resulting mixture of salts was collected by filtration, washed several times with benzene and dried. This mixture was added little by little to a stirred dilute hydrochloric acid solution which caused the formation of a precipitate. The stirring was continued for 30 minutes and the precipitate was collected, washed with distilled water and dried in vacuo. There was thus obtained 2-hydroxy-methylene-19-nor-testosterone.

From the corresponding 17α-lower alkyl derivatives of 19-nor-testosterone there were obtained 2-hydroxymethylene derivatives of 17α-methyl-19-nor-testosterone, of 17α-ethyl-19-nor-testosterone and the like.

Example XI

Following the method of Example III except that 2-hydroxymethylene-19-nor-testosterone was used instead of 2-hydroxymethylene-17α-methyl-testosterone, there was obtained 2-benzoxymethylene-19-nor-testosterone.

Example XII

Following the method of the preceding example except that there were used other acid halides such as acetyl chloride, propionyl chloride and cyclopentylpropionyl chloride instead of benzoyl chloride to produce the corresponding 2-acetoxymethylene-19-nor-testosterone, 2-propionoxymethylene-19-nor-testosterone and 2-cyclopentylpropionoxymethylene-19-nor-testosterone.

Example XIII

A solution of 1 g. of 2-hydroxy-methylene-19-nor-testosterone in 10 cc. of pyridine was treated with 3 cc. of propionic anhydride and the mixture was kept at room temperature overnight. After pouring into water, the resulting suspension was heated for half an hour on the steam bath, then cooled, the precipitate which formed was collected, washed with water and dried. Crystallization from acetone-hexane gave the 2,17-dipropionate of 2-hydroxymethylene-19-nor-testosterone.

Example XIV

Following the method of Example XII except that the propionic anhydride was substituted by 2.1 molar equivalents of propionyl chloride, there was obtained the same final product. By the same methods as this example and that of Example IV, using other corresponding acid anhydrides or chlorides, there were prepared the corresponding 2,17-diacetate, 2,17-dibenzoate and 2,17-dicyclopentyl-propionate of 2-hydroxymethylene-19-nor-testosterone.

Example XV 1 g. of 2-benzoxymethylene-19-nor-testosterone obtained in accordance with Example XI was dissolved in 10 cc. of pyridine and mixed with 2 cc. of propionic anhydride. The mixture was refluxed and worked up as in Example VI to give 2-benzoxymethylene-17β-propionoxy-19-nor-testosterone. By the same method using the corresponding anhydride, there were prepared the 2-benzoxymethylene-17β-acetoxy-19-nor-testosterone, the 2-benzoxymethylene-17β-cyclopentyl propionoxy-19-nor-testosterone.

Example XVI

Following the methods of Examples III to VII except that 2-hydroxymethylene-17α-methyl-19-nor-testosterone was used instead of the 2-hydroxymethylene testosterones, there were obtained the corresponding 2-esters and 2,17-diesters of 2-hydroxymethylene-17α-methyl-19-nor-testosterone.

Example XVII

Following the method of Example VIII except that 2-hydroxymethylene 19-nor-testosterone and 2-hydroxymethylene-17α-methyl-19-nor-testosterone were used instead of 2-hydroxymethylene-17α-methyl testosterone, there were obtained 2-methoxymethylene-19-nor testosterone and 2-methoxymethylene-19-nor-17α-methyl-testosterone. The same method applied to other 2-hydroxymethylene-17α-lower alkyl-19-nor-testosterones gave corresponding 2-methoxy compounds.

We claim:
1. A compound of the following formula:

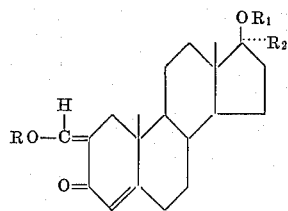

wherein R is selected from the group consisting of lower alkyl, benzyl and hydrocarbon carboxylic acyl of less than 12 carbon atoms; $R_1$ is selected from the group consisting of hydrogen and hydrocarbon carboxylic acyl of less than 12 carbon atoms; $R_2$ is lower alkyl.

2. The 2-lower alkyl-ether derivatives of 2-hydroxymethylene-17α-lower alkyl-Δ⁴-androsten-17β-ol-3-one.

3. 2-methoxymethylene-17α-methyl-Δ⁴-androstene-17β-ol-3-one.

4. The 2-monoesters of 2-hydroxymethylene-17α-lower alkyl-Δ⁴-androsten-17β-ol-3-one in which the ester group is derived from a hydrocarbon carboxylic acid of less than 12 carbon atoms.

5. The 2,17-diesters of 2-hydroxymethylene-17α-lower alkyl-Δ⁴-androsten-17β-ol-3-one in which the ester groups are derived from a hydrocarbon carboxylic acid of less than 12 carbon atoms.

6. A compound of the following formula:

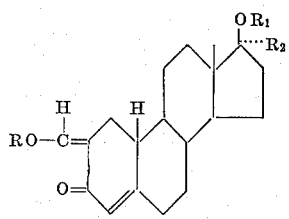

wherein R is selected from the group consisting of hydrogen, lower alkyl, benzyl and hydrocarbon carboxylic acyl of less than 12 carbon atoms; $R_1$ is selected from the group consisting of hydrogen and hydrocarbon carboxylic acyl of less than 12 carbon atoms; $R_2$ is lower alkyl.

7. 2 - hydroxymethylene - 19 - nor - 17α - methyl-testosterone.

8. 2 - hydroxymethylene - 19 - nor - 17α-ethyl-testosterone.

9. The 2-lower alkyl-ether derivatives of 2-hydroxymethylene-19-nor-testosterone.

10. The 2-lower alkyl ether derivative of 2-hydroxymethylene-19-nor-17α-lower alkyl testosterone.

11. 2-methoxy methylene-19-nor-testosterone.

12. 2 - methoxy methylene - 19 - nor - 17α - methyl-testosterone.

13. The 2-monoesters of hydrocarbon carboxylic acids of less than 12 carbon atoms of 2-hydroxymethylene-19-nor-testosterone.

14. The 2, 17-diesters of hydrocarbon carboxylic acids of less than 12 carbon atoms of 2-hydroxymethylene-19-nor-testosterone.

15. The 2-monoesters of hydrocarbon carboxylic acids of less than 12 carbon atoms of 2-hydroxymethylene-19-nor-17α-lower alkyl-testosterone.

16. The 2,17-diesters of hydrocarbon carboxylic acids of less than 12 carbon atoms of 2-hydroxymethylene-19-nor-17α-lower alkyl-testosterone.

References Cited by the Examiner
UNITED STATES PATENTS

| | | | |
|---|---|---|---|
| 2,281,622 | 5/1942 | Ruzicka | 260—397.1 |
| 2,744,122 | 5/1956 | Djerassi et al. | 260—397.4 |
| 2,883,401 | 4/1959 | Babcock et al. | 260—397.45 |

OTHER REFERENCES

Ringold et al.: J.A.C.S., vol. 81 (Jan. 29, 1959), pages 427–432.

Weisenborn et al.: J. Am. Chem. Soc., vol. 76 (January 20, 1954), pages 552–555.

LEWIS GOTTS, *Primary Examiner.*

L. H. GASTON, M. LIEBMAN, ELBERT L. ROBERTS, *Examiners.*

T. J. MORGAN, G. E. LANDE, H. A. FRENCH, *Assistant Examiners.*